(12) United States Patent
Barrow

(10) Patent No.: US 9,026,160 B1
(45) Date of Patent: May 5, 2015

(54) METHOD AND SYSTEM FOR PRIORITY HANDLING OF DISPATCH CALL REQUESTS

(75) Inventor: Steven W. Barrow, South Riding, VA (US)

(73) Assignee: Nextel Communications, Inc., Reston, VA (US)

( * ) Notice: Subject to any disclaimer, the term of this patent is extended or adjusted under 35 U.S.C. 154(b) by 2055 days.

(21) Appl. No.: 11/481,690

(22) Filed: Jul. 6, 2006

Related U.S. Application Data

(60) Provisional application No. 60/696,802, filed on Jul. 7, 2005.

(51) Int. Cl.
- *H04B 7/00* (2006.01)
- *H04W 4/00* (2009.01)
- *H04L 12/66* (2006.01)
- *H04M 15/00* (2006.01)
- *H04M 3/42* (2006.01)
- *H04W 88/00* (2009.01)
- *H04L 29/06* (2006.01)

(52) U.S. Cl.
CPC ......... *H04W 88/00* (2013.01); *H04L 29/06442* (2013.01)

(58) Field of Classification Search
CPC ........... H04W 4/00; H04W 4/10; H04W 4/16; H04W 4/22; H04W 12/02; H04W 72/06; H04W 72/10; H04W 76/005; H04W 76/007; H04W 76/02; H04W 80/04; H04W 84/08; H04W 88/06; H04W 88/08; H04L 12/5695; H04L 29/06027; H04L 29/06326; H04L 29/06442; H04L 63/065; H04M 1/663; H04M 3/436; H04M 3/54; H04M 7/006; H04M 15/00

USPC ......... 455/508, 512, 517, 520, 352, 412, 414, 455/433, 434, 436, 450, 452, 453, 456, 509, 455/511, 518, 519, 521, 552, 522, 458, 507, 455/1, 550.1, 552.1, 565; 370/252, 260, 370/328, 329, 352, 353, 389, 392, 465; 709/203, 223, 224, 226, 230, 329; 379/88.23, 188, 197, 201.07, 207.15, 379/210.02

See application file for complete search history.

(56) References Cited

U.S. PATENT DOCUMENTS

| | | | |
|---|---|---|---|
| 5,467,388 A * | 11/1995 | Redd et al. | 379/210.02 |
| 6,067,457 A * | 5/2000 | Erickson et al. | 455/512 |
| 6,282,429 B1* | 8/2001 | Baiyor et al. | 455/512 |
| 6,317,607 B1* | 11/2001 | Tomcik et al. | 455/552.1 |
| 6,411,815 B1* | 6/2002 | Balasuriya | 455/512 |
| 6,560,649 B1* | 5/2003 | Mullen et al. | 709/226 |
| 6,701,160 B1* | 3/2004 | Pinder et al. | 455/550.1 |
| 6,980,523 B1* | 12/2005 | Lipford et al. | 370/252 |
| 7,295,851 B2* | 11/2007 | Liu et al. | 455/517 |
| 7,974,608 B2* | 7/2011 | Chin et al. | 455/415 |
| 2001/0051534 A1* | 12/2001 | Amin | 455/565 |
| 2002/0077136 A1* | 6/2002 | Maggenti et al. | 455/518 |
| 2006/0148497 A1* | 7/2006 | Fernandez et al. | 455/507 |

\* cited by examiner

*Primary Examiner* — Yuwen Pan
*Assistant Examiner* — Paul P Tran

(57) ABSTRACT

A method and system for priority handling of a dispatch call in a dispatch network is disclosed. A dispatch call request message from a mobile communications unit is received at a dispatch cell site. The cell site determines whether a DAP is configured for operation in a call request reject mode. The cell site determines a priority level of the mobile communications unit if the DAP is configured in the call request reject mode. When the priority level meets a defined threshold, the cell site forwards the dispatch call request message to the DAP and the DAP processes the dispatch call request message.

20 Claims, 3 Drawing Sheets

METHOD AND SYSTEM FOR PRIORITY HANDLING OF DISPATCH CALL REQUESTS

This application claims the benefit of U.S. Provisional Patent Application Ser. No. 60/696,802, filed Jul. 7, 2005, the disclosure of which is herein expressly incorporated by reference.

FIELD OF THE INVENTION

The present invention relates generally to the field of telecommunications, and in particular, to a method and system for priority handling of dispatch call requests.

BACKGROUND OF THE INVENTION

Cellular communications systems typically provide interconnect and/or dispatch voice communication services. Interconnect voice communication services are those typically provided by most cellular carriers as circuit-switched communications. As is known, dispatch communications are half-duplex communications where only one person at a time is able to speak. Dispatch communication services are commonly known as a push-to-talk (PTT) or walkie-talkie type of call, such as Sprint Nextel's service identified by the trade name Direct Connect. One type of network that supports both interconnect and dispatch communications is the Integrated Digital Enhanced Network (iDEN). In the iDEN network, dispatch communications are supported by dispatch application processors (DAPs).

In the current iDEN network as provided by Motorola, when a DAP enters its highest central processing unit (CPU) Load Shedding Level (Level 1), all dispatch call requests are rejected by the DAP, including dispatch calls that are originated by high priority callers, e.g., public safety agencies. This can be counterproductive during an emergency since, whereas public safety agencies may have the ability to acquire a dispatch channel at the radio frequency (RF) layer due to having a higher RF priority, the public safety agency may still be unable to initiate or receive dispatch calls due to the DAP(s) being in a CPU Load Shedding mode of operation. Therefore, even though high priority callers may have the ability to make a dispatch call due to their higher priority, the DAP systematically rejects calls from even these callers when operating in Load Shedding Level 1.

High priority callers, particularly public safety agencies, should have the ability to initiate and receive dispatch calls even when the DAP is in its highest CPU Load Shedding Level (Level 1). Therefore, there is a need for a method and system to allow for priority handling of dispatch call requests even when the dispatch network is in an operational mode where all call requests are normally rejected.

SUMMARY OF THE INVENTION

In an embodiment of a method of the present invention, a method for priority handling of a dispatch call in a dispatch network is provided. The method includes the steps of receiving a dispatch call request message from a mobile communications unit at a dispatch cell site. The cell site determines whether an associated DAP is configured for operation in a call request reject mode. If the DAP is configured in the call request reject mode, the cell site determines a priority level of the mobile communications unit. If the priority level meets a defined threshold, the cell site forwards the dispatch call request message to the DAP and the DAP processes the dispatch call request message.

In an embodiment of a system of the present invention, the system includes a dispatch cell site and an associated DAP. The DAP is configured for operation in the call request reject mode. The cell site receives a dispatch call request message from a mobile communications unit and forwards the request message to the DAP if a priority level of the mobile communications unit meets a defined threshold. The DAP processes the dispatch call request message.

DETAILED DESCRIPTION OF THE EXEMPLARY EMBODIMENTS

Figure 1:
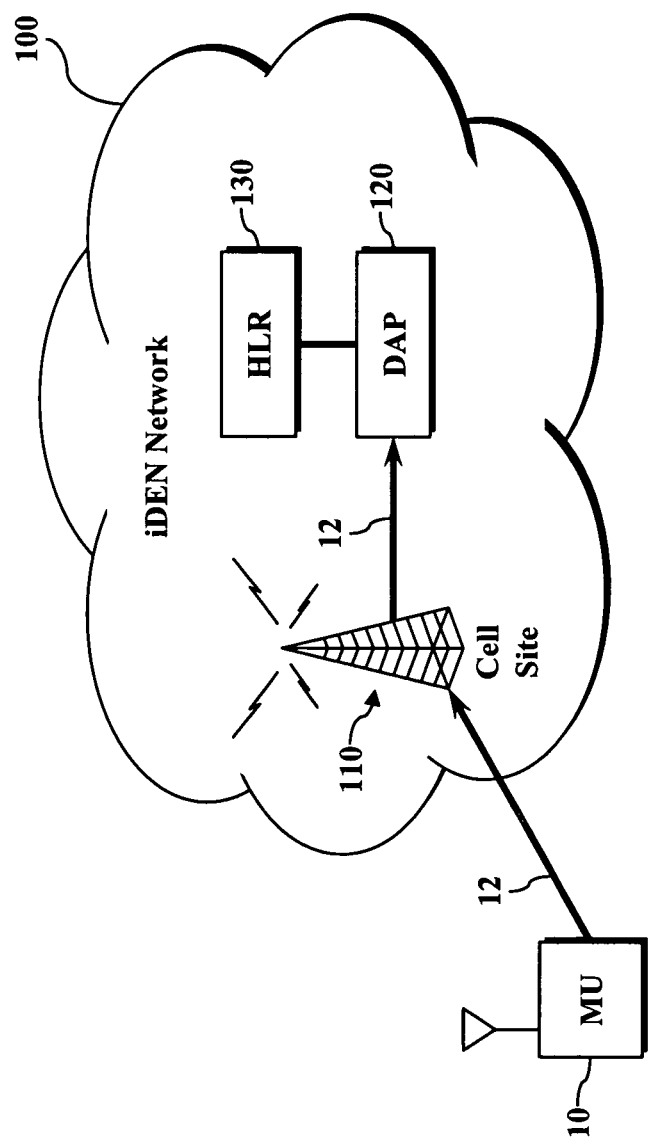
FIG. 1 illustrates an exemplary system in accordance with the principles of the present invention.

As can be seen in FIG. 1, the iDEN network 100 includes, among other components, a cell site 110 and a dispatch application processor (DAP) 120. Additionally, a home location register (HLR) 130 is included in network 100. Each of these components is well-known and, therefore, a detailed discussion of these components is not provided. As is also well-known, when a dispatch caller desires to make a dispatch call, the mobile communications unit 10 of the caller sends a call request message 12 to a cell site in the cell in which the phone is operating. The cell site forwards the dispatch call request message to the associated DAP 120 where the DAP processes the call request based on known techniques.

In accordance with exemplary embodiments of the present invention, when the DAP 120 enters its highest level of CPU Load Shedding (Level 1), i.e., a call request reject mode, the DAP sends a DAP load shedding update message to all of the iDEN cell sites (ACG/ISCs) that the DAP serves. FIG. 1 only illustrates one cell site, i.e., cell site 110, associated with DAP 120, however, it is understood that many cell sites may be associated with a DAP. Upon receipt of the DAP load shedding update message, each ACG/ISC rejects all new dispatch call requests received from mobile communication units of all network subscribers except those that are identified as being received from dispatch priority handsets. Thus, the mobile communication unit(s) of a high priority caller, e.g., a unit used by a public safety agency caller, is associated with a priority level. When the cell site determines that the received dispatch call request is from a priority caller, by determining the priority level of the mobile unit that sent the request, the cell site forwards the request to the DAP for processing of the call. Therefore, for this priority caller, the cell site forwards the call request to the DAP even though the DAP is configured for operation in a call request reject mode because the priority of the call request meets a defined threshold.

As discussed above, the cell site can determine that the DAP is configured in the call request reject mode because the DAP sends a message indicating such to the cell site. Further, the cell site can determine that the call request message should be sent to the DAP even though the DAP is operating in the call request reject mode by determining the priority of the caller. The present invention is not limited to any particular methodology for providing the priority information to the cell site. All that is required is that the cell site be able to determine the priority of the caller so that it can further determine, based on this priority, whether or not to forward the request to the DAP for processing when the DAP is in the call request reject mode.

When the DAP is no longer in CPU Load Shedding Level 1, the DAP sends a DAP load shedding end message to all of the iDEN cell sites (ACG/ISCs) that the DAP serves. Upon receipt of the DAP load shedding end message, each ACG/ISC processes all dispatch call requests normally, i.e., all call requests are forwarded to the DAP for processing in accordance with known procedures.

In accordance with an embodiment of the present invention, the mobile communications unit itself provides the priority information to the cell site. As is known, when a dispatch caller desires to place a dispatch call, the mobile communications unit, i.e., the dispatch handset, sends a "Private Call Request" message to the iDEN network. In accordance with the principles of the present invention, the "Private Call Request" message is modified to include the priority information of the communications unit. Thus, the communications unit notifies the iDEN network, e.g., the cell site, of its priority level by using a modified "Private Call Request" message.

Figure 2:
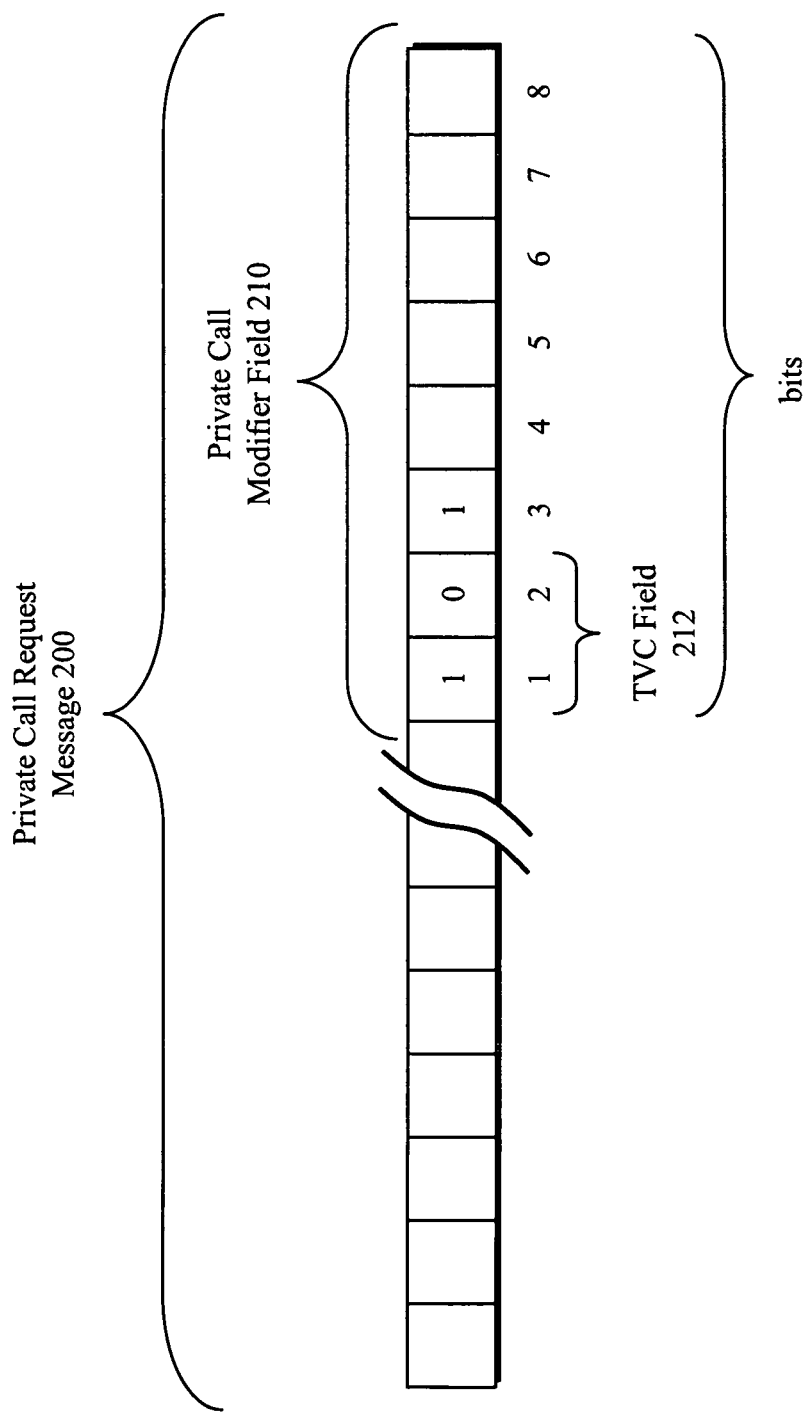
FIG. 2 illustrates an embodiment of a call request message in accordance with the principles of the present invention.

Specifically, the "Private Call Request" message 200, as can be seen in FIG. 2, includes a "Private Call Modifier" field 210. This field can be modified from that currently known to include the priority information. Currently in the iDEN network, the "Private Call Modifier" field is 1 byte (8 bits) where only 2 bits (bits 1 and 2) are used to identify the "Twelve-to-One Version Capability (TVC)" of the communications unit. Whereas it is not required for an understanding of the present invention, for information purposes, the following are the current values used for the two bits of the Twelve-to-One Version Capability (TVC) field 212:

00 The Mobile Station (MS), i.e., the communications unit, only supports 6:1 dispatch calls or requests a 6:1 dispatch call;

01 Version 1 MS that supports and requests a 12:1 dispatch call;

10 Version 2 MS that supports and requests a 12:1 dispatch call; and

11 Version 3 MS that supports and requests a 12:1 dispatch call.

In this embodiment, at least one of the remaining 6 bits, i.e., bits 3 to 8, is used to indicate if the communications unit is a dispatch priority communications unit. For example, if bit field 3 is set to 1, as shown in FIG. 2, this indicates a communications unit that has dispatch priority even when the DAP is at its highest level for CPU Load Shedding. Thus, whenever the communications unit sends a "Private Call Request" message to the iDEN network, it has bit 3 set to 1 in the "Private Call Modifier" field.

Thus, if the DAP has notified the iDEN cell site (ACG/ISC) that it was operating at CPU Load Shedding Level 1, the ACG/ISC then performs a check on every "Private Call Request" message that it receives in order to determine if the 3rd bit in the "Private Call Modifier" field is set to 1. If it is, the cell site sends the call request message to the DAP for further processing. If it is not set to 1, the call request message is not forwarded to the DAP, and thus, the call cannot be made.

In accordance with another embodiment for providing the priority information of the communications unit to the cell site, the priority information is provisioned in the HLR. In this embodiment, the subscribers with dispatch priority handsets have this information provisioned in the iDEN HLR. When the subscriber registers his/her phone in the iDEN network, the priority information is provided during dispatch registration from the HLR to the mobile communications unit, e.g., during the known "Insert Subscriber Data" procedure. The mobile communications unit then, as described previously, provides this priority information to the cell site.

The priority information itself is not limited to any particular format or content. All that is required is that priority communications units be identified so that call requests from these units can be processed even when the DAP is operating in a call request reject mode. The priority information can be a bit that is set in an "on" or "off" condition, as discussed above, or can be a scaled numerical value, e.g., assigned a relative value on a scale of 1 to 10 where 1 is low priority and 10 is the highest priority. In this circumstance, if the set priority level is below a defined threshold value, e.g., a value of 5 on the scale of 1 to 10, then the cell site would not forward the request to the DAP, and if the level is above the threshold value then the cell site would forward the request to the DAP.

Further, the present invention is not limited to only providing the operational mode information related to the DAP to the cell site by the DAP sending a message(s) to the cell site(s). All that is required is that the cell site have this information for processing of call requests. For example, this information can be provided to the cell site from other network components. Additionally, whereas in an embodiment, the cell site performs its functionality when the DAP is in CPU Load Shedding Level 1, the present invention is not limited to only providing priority handling of dispatch call requests when the DAP is in this operational mode. The present invention can be practiced in any operational configuration for the DAP where the DAP is not accepting all call requests, i.e., any call request reject mode. It is not required that the DAP be rejecting all call requests. The present invention has utility where the DAP is accepting less than all call requests, and therefore, with the present invention, priority calls can be processed where otherwise they may have been rejected.

Figure 3:
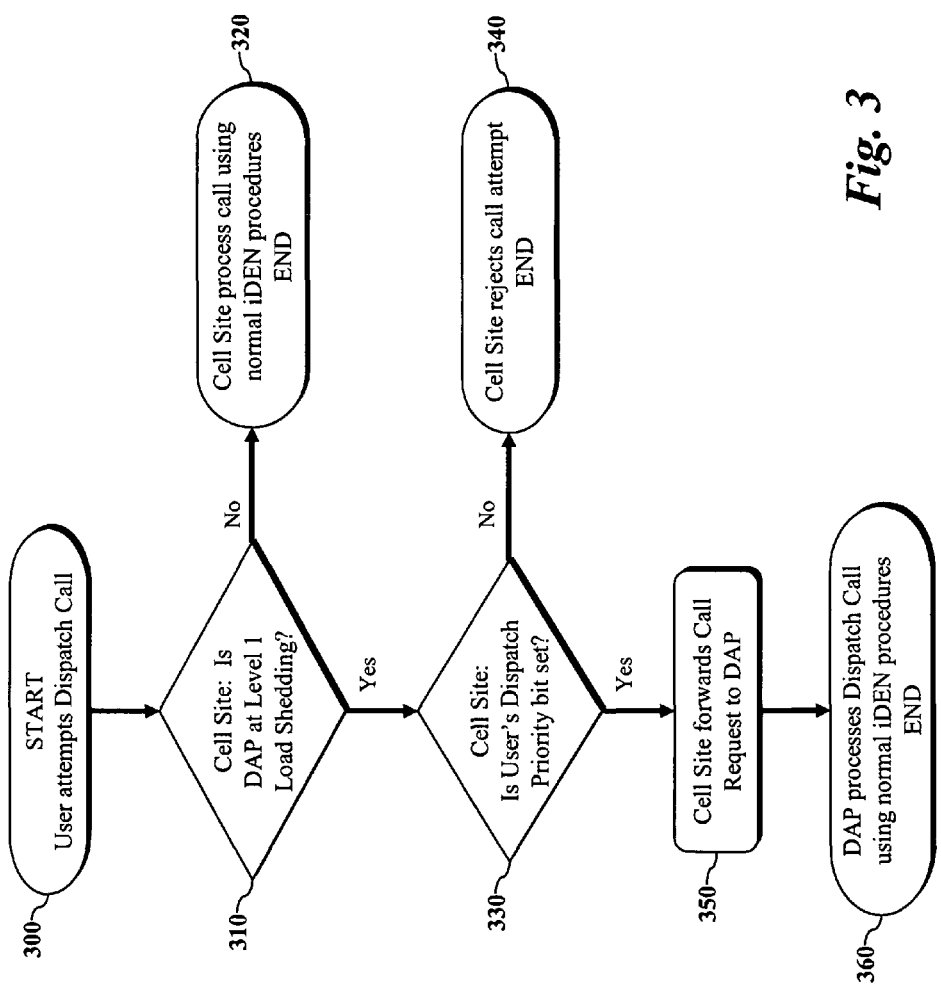
FIG. 3 illustrates an embodiment of a method in accordance with the principles of the present invention.

FIG. 3 provides a flow chart for an embodiment of a method of the present invention. In step 300, a user attempts to make a dispatch call. As described previously, the mobile communications unit sends a call request message to the cell site. In step 310, the cell site determines if the DAP is operating in the call request reject mode, e.g., the Level 1 Load Shedding mode. If no, in step 320 the cell site processes the call request using normal procedures and the process ends. If yes, in step 330 the cell site must then determine if the caller is a priority caller. As discussed above, the cell site, in an embodiment, checks to see if the priority bit is set in the call request message. If the caller is not a priority caller, in step 340 the cell site rejects the call attempt and the process ends. If the caller is a priority caller, in step 350 the cell site forwards the call request to the DAP for further call processing. In step 360, the DAP then processes the dispatch call request using normal iDEN procedures.

As used herein, the terms mobile communications unit and handset should be interpreted as encompassing any type of device capable of supporting dispatch communications, including, but not limited to, cellular telephones, personal digital assistants (PDAs), wireless computers, and/or the like.

Although exemplary embodiments have been described in connection with private dispatch calls, i.e., calls between only two parties, the present invention is also applicable to group dispatch calls and dispatch call alerts, as are known. Moreover, although exemplary embodiments of the present invention have been described in connection with the iDEN network, the present invention can be used in any dispatch network to address load shedding issues of dispatch processors. Moreover, although the present invention has been described as providing priority to public safety agencies, the priority can be assigned by a network operator to any particular one or group of subscribers.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for priority handling of a dispatch call in a dispatch network, comprising the steps of:
   receiving a dispatch call request message from a mobile communications unit at a dispatch cell site;
   determining whether a dispatch application processor (DAP) is configured for operation in a call request reject mode at the direction of the dispatch network wherein all dispatch call requests for incoming and outgoing calls to the dispatch cell site are rejected by the cell site;
   determining a priority level of the mobile communications unit by the cell site if the DAP is configured in the call request reject mode;
   forwarding the dispatch call request message by the cell site to the DAP if the priority level meets a defined threshold when the DAP is configured for operation in the call request reject mode; and
   processing the forwarded dispatch call request message by the DAP.

2. The method of claim 1, wherein the dispatch call request message includes the priority level of the mobile communications unit.

3. The method of claim 1, further comprising the step of provisioning the priority level of the mobile communications unit in a home location register (HLR) associated with the mobile communications unit.

4. The method of claim 3, wherein the step of determining the priority level of the mobile communications unit includes the step of obtaining the priority level from the HLR upon registration of the mobile communications unit in the dispatch network.

5. The method of claim 1, further comprising the step of receiving an operation configuration message at the cell site from the DAP.

6. The method of claim 5, wherein the operation configuration message identifies that the DAP is configured for operation in the call request reject mode.

7. The method of claim 5, wherein the operation configuration message identifies that the DAP has re-configured from operation in the call request reject mode to a normal operation mode.

8. The method of claim 2, wherein the dispatch call request message is an Integrated Digital Enhanced Network (iDEN) private call request message and wherein a private call modifier field of the iDEN private call request message includes the priority level of the mobile communications unit.

9. The method of claim 8, wherein the priority level is included in at least one of bits 3 through 8 of the private call modifier field.

10. The method of claim 9, wherein a twelve-to-one version capability identifier is included in bits 1 and 2 of the private call modifier field.

11. The method of claim 1, further comprising the step of not forwarding a second dispatch call request message received at the cell site to the DAP when the DAP is configured for operation in the call request reject mode and when a priority level of a second mobile communications unit associated with the second dispatch call request message does not meet the defined threshold.

12. A system for priority handling of a dispatch call in a dispatch network, comprising:
   a dispatch cell site, wherein the cell site receives a dispatch call request message from a mobile communications unit; and
   a dispatch application processor (DAP) configured for operation in a call request reject mode at the direction of the dispatch network wherein all dispatch call requests for incoming and outgoing calls to the dispatch cell site are rejected;
   wherein the dispatch call request message is forwarded by the cell site to the DAP if a priority level of the mobile communications unit meets a defined threshold when the DAP is configured for operation in the call request reject mode and wherein the DAP processes the forwarded dispatch call request message.

13. The system of claim 12, wherein the dispatch call request message includes the priority level of the mobile communications unit.

14. The system of claim 12, further comprising a home location register (HLR) coupled to the dispatch network and wherein the priority level of the mobile communications unit is provisioned in the HLR.

15. The system of claim 14, wherein the cell site obtains the priority level from the HLR upon registration of the mobile communications unit in the dispatch network.

16. The system of claim 12, wherein the cell site receives an operation configuration message from the DAP.

17. The system of claim 12, wherein the dispatch network is an Integrated Digital Enhanced Network (iDEN).

18. The system of claim 17, wherein the dispatch call request message is an iDEN private call request message and wherein a private call modifier field of the iDEN private call request message includes the priority level of the mobile communications unit.

19. The system of claim 18, wherein the priority level is included in at least one of bits 3 through 8 of the private call modifier field.

20. The system of claim 19, wherein a twelve-to-one version capability identifier is included in bits 1 and 2 of the private call modifier field.

* * * * *